(12) United States Patent
Bauck et al.

(10) Patent No.: US 8,568,112 B2
(45) Date of Patent: Oct. 29, 2013

(54) RECIPROCATING PISTON PUMP WITH AIR VALVE, DETENT AND POPPETS

(75) Inventors: Mark L. Bauck, Coon Rapids, MN (US); John F. Isais, Jr., Brooklyn Park, MN (US); Mark T. Weinberger, Mounds View, MN (US); David M. Pittman, Sussex, WI (US); Michael E. Bloom, Oak Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 806 days.

(21) Appl. No.: 11/996,444

(22) PCT Filed: Jul. 26, 2006

(86) PCT No.: PCT/US2006/029062
§ 371 (c)(1),
(2), (4) Date: Jan. 22, 2008

(87) PCT Pub. No.: WO2007/016177
PCT Pub. Date: Feb. 8, 2007

(65) Prior Publication Data
US 2008/0213105 A1      Sep. 4, 2008

Related U.S. Application Data

(60) Provisional application No. 60/747,604, filed on May 18, 2006, provisional application No. 60/704,046, filed on Jul. 29, 2005.

(51) Int. Cl.
*F04B 35/00* (2006.01)
*F04B 17/00* (2006.01)

(52) U.S. Cl.
USPC ............................................ 417/390; 417/375

(58) Field of Classification Search
USPC ......... 417/375; 251/60, 63, 65; 137/102, 104, 137/106, 901, 906
See application file for complete search history.

(56) References Cited

U.S. PATENT DOCUMENTS

| | | | |
|---|---|---|---|
| 1,406,330 A | | 2/1922 | Barner |
| 3,174,409 A | | 3/1965 | Hill |
| 3,282,167 A | | 11/1966 | McKenzie |
| 3,370,603 A | * | 2/1968 | Ifield et al. ..................... 137/102 |
| 3,618,468 A | | 11/1971 | Gardner et al. |
| 3,635,125 A | | 1/1972 | Rosen et al. |
| 3,837,765 A | | 9/1974 | Weise et al. |
| 3,887,765 A | | 6/1975 | Murahse et al. |
| 3,943,823 A | * | 3/1976 | Tammy .......................... 91/306 |
| 3,963,383 A | | 6/1976 | Hill |
| 4,079,660 A | | 3/1978 | Ives |
| 4,104,008 A | | 8/1978 | Hoffmann et al. |
| 4,298,027 A | * | 11/1981 | Neff .......................... 137/625.65 |
| 4,555,221 A | * | 11/1985 | DuBois .......................... 417/349 |
| 4,846,045 A | * | 7/1989 | Grach et al. .................... 91/306 |
| 5,174,731 A | * | 12/1992 | Korver .......................... 417/393 |
| 5,277,099 A | | 1/1994 | Powers |
| 5,363,739 A | | 11/1994 | Sydow |

(Continued)

*Primary Examiner* — Charles Freay
*Assistant Examiner* — Alexander Comley
(74) *Attorney, Agent, or Firm* — Douglas B. Farrow

(57) ABSTRACT

An air valving system for a reciprocating piston pump (5) which uses piston (10) actuated poppet assemblies (40) to control the main air valve (16) shift. The valve exhaust is vented (50) directly to atmosphere rather than through the main exhaust to ensure reliability. A ramped detent (32) prevents the air valve (16) from centering.

3 Claims, 12 Drawing Sheets

(56) References Cited

U.S. PATENT DOCUMENTS

| | | | |
|---|---|---|---|
| 5,366,353 A | * | 11/1994 | Hand .................... 417/375 |
| 5,584,666 A | * | 12/1996 | Kozumplik et al. ............ 417/46 |
| 6,123,008 A | | 9/2000 | Scherer |
| 6,126,403 A | * | 10/2000 | Yamada .................... 417/46 |
| 6,386,841 B1 | | 5/2002 | Probst |
| 6,722,256 B2 | | 4/2004 | Roberts et al. |
| 2005/0123416 A1 | * | 6/2005 | Smith .................... 417/375 |

* cited by examiner

RECIPROCATING PISTON PUMP WITH AIR VALVE, DETENT AND POPPETS

TECHNICAL FIELD

This application claims the benefit of U.S. Application Ser. Nos. 60/704,046, filed Jul. 29, 2005 and 60/747,604 filed May 18, 2006.

BACKGROUND ART

Air-operated reciprocating piston pumps are well known for the pumping of various fluids. Such pumps typically have mechanically or pneumatically operated air valves to control the flow of air to the two sides of the piston.

DISCLOSURE OF THE INVENTION

It is therefore an object of this invention to provide a system which allows enhanced control of a reciprocating air motor by minimizing changeover time and reducing the tendency of the valve to ice.

The instant invention shortens the exhaust porting in the air valve to minimize the effects of icing. These embodiments allow the exhaust to flow straight through the valve eliminating the cup lift associated with traditional u-cup designs which have to turn the exhaust air. Valve actuation forces are independent of supply pressure due to opposing valve plates.

The air valve is constructed of two opposing stationary valve plates and a moving through-cup positioned between the plates. The through-cup(s) have separate exhaust and supply ports that function as a four way valve. The through-cup is constructed of two spring loaded mating cups with a sealed exhaust port passing straight through the assembly.

In one embodiment, there are dual through-cups with one supply and one exhaust port. This configuration requires a cylinder A and B port, two exhaust ports (one for each cup) and a sealed valve housing which supplies pressurized air. The advantage of this configuration is that the separate valve mechanisms can be located at the cylinder ends to minimize port length.

In another embodiment, a single through-cup has an exhaust port only. This configuration requires a cylinder A and B port, one exhaust port and a sealed valve housing which supplies pressurized air. With this embodiment, only one through-cup is required.

In yet another embodiment, a single through-cup is provided with a central supply port and two exhaust ports. This allows a leaky logic pilot scheme without inverted pilot porting.

The motor valving includes two poppet assemblies with one being located in the top cap and the other in the bottom cap. The poppet assembly includes a t-shaped sealing material that seals on both faces. Through most of the motor stroke, the A side of the poppet assembly is sealed preventing air leakage from the valve piston. As the motor reaches the end of its stroke, the motor piston opens the poppet's A side while sealing the B side. When the poppet opens, it vents one side of the piston valve, shifting the valve. Sealing the poppet on the B side ensures the depressurized side of the valve piston does not have a replenishing air supply thereby maximizing valve speed. After motor changeover, the poppet resets to its normal position. Fast changeover and valve speed translates to reduced output pressure pulsation from the pump and increased performance and efficiency.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
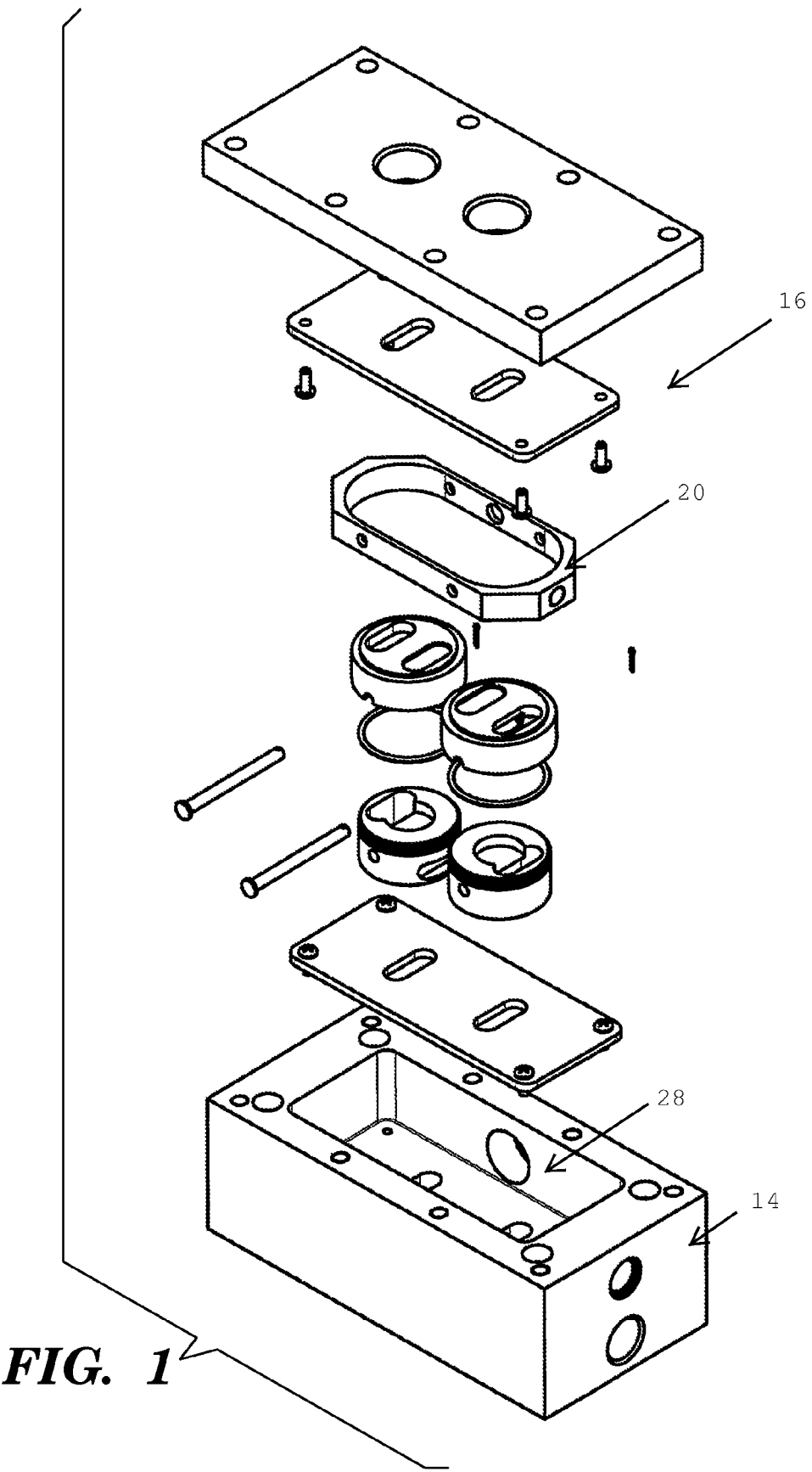
FIG. 1 shows a cross-section of the air valve of the instant invention.
Figure 2A:
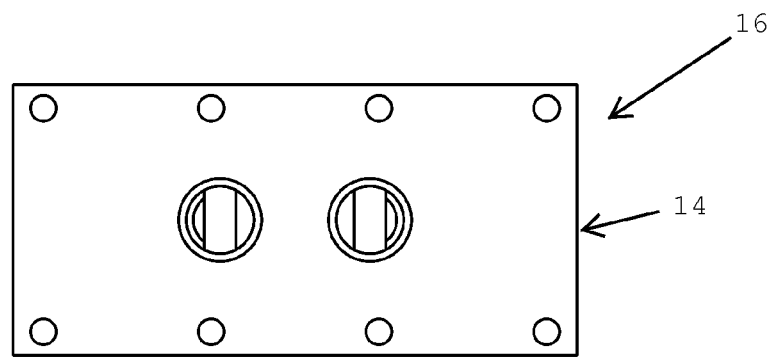
FIG. 2 shows a cross-section (opposite that of FIG. 1) of the air valve of the instant invention.
Figure 2B:
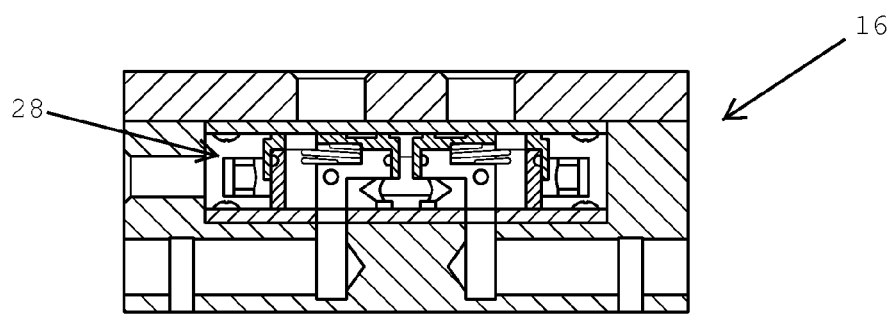
Figure 2C:
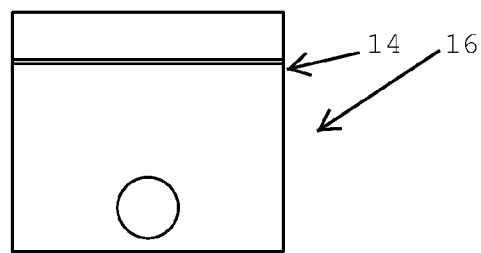
Figure 3A:
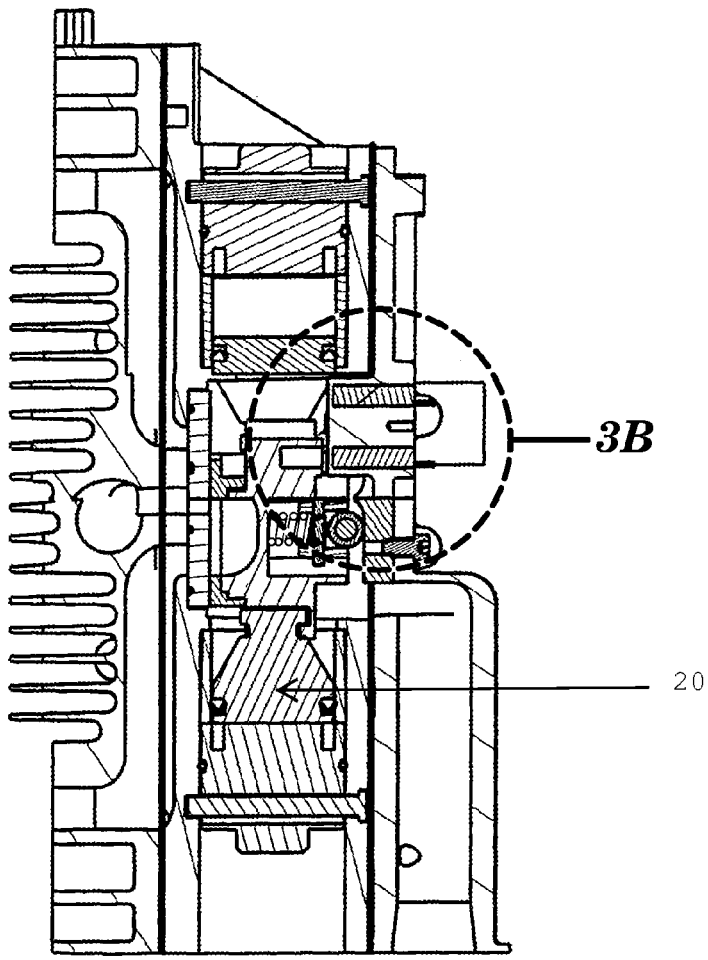
FIG. 3 shows an exploded view of the air valve of the instant invention.
Figure 3B:
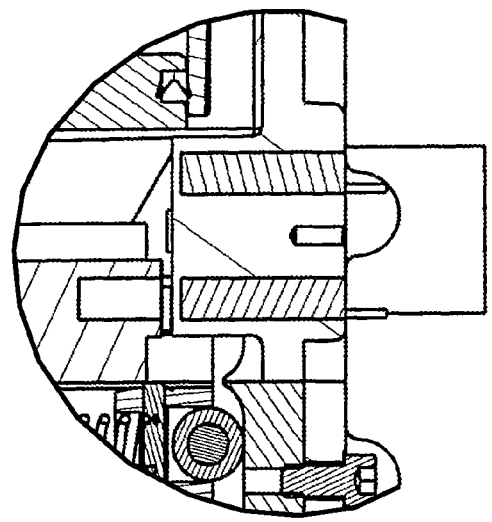
Figure 4:
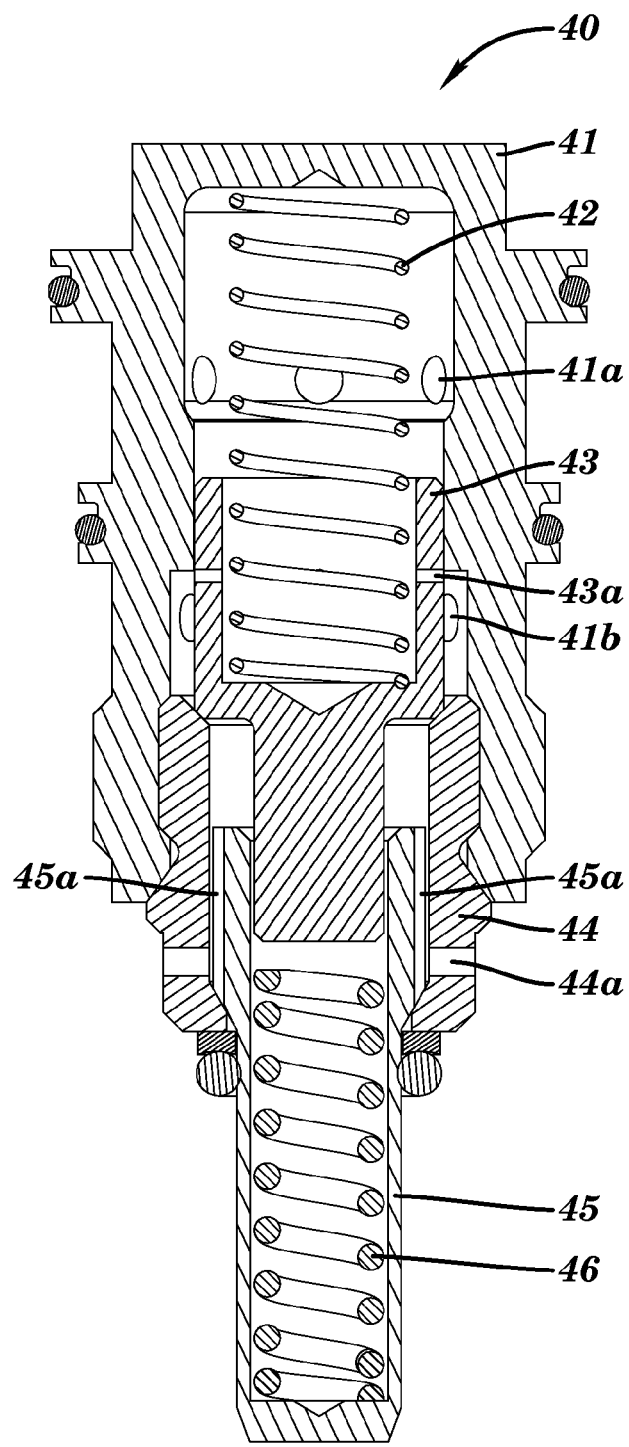
FIG. 4 shows a cross-section of the poppet valve in the closed position.
Figure 5:
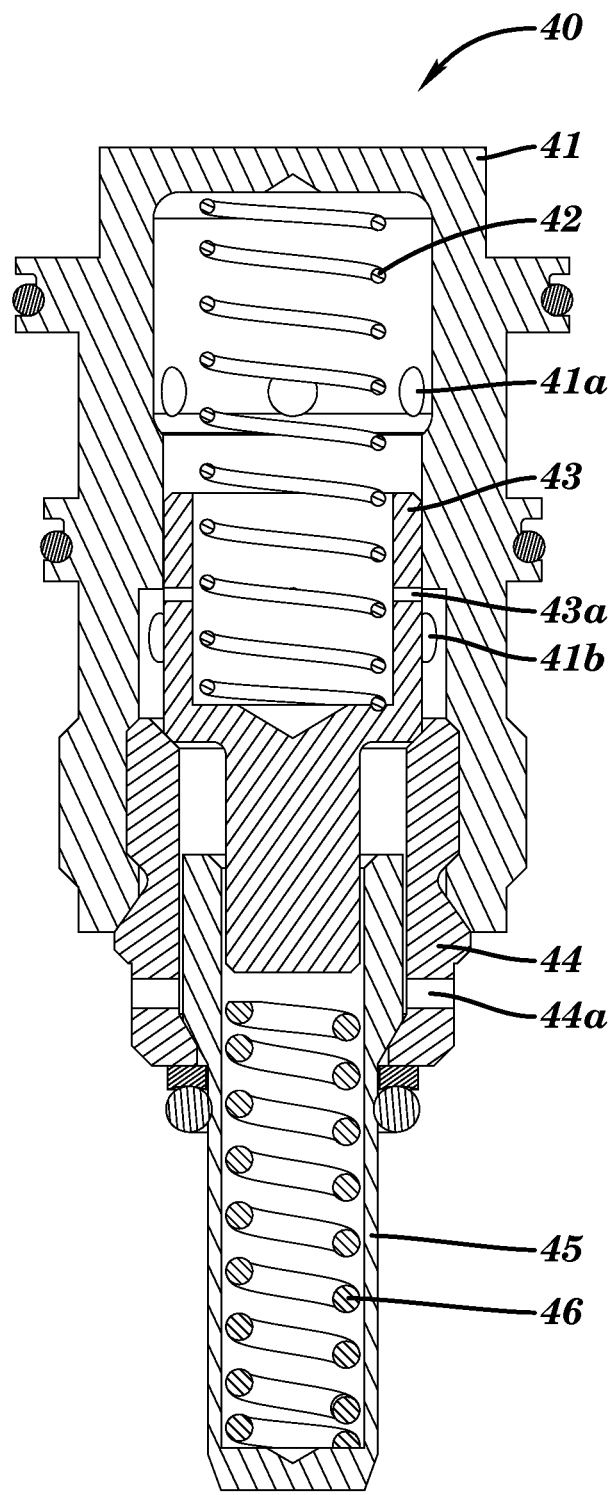
FIG. 5 shows a cross-section of the poppet valve in the open position.

The air valve may be constructed of two opposing stationary valve plates and a moving through-cup positioned between the plates. The through-cup(s) have separate exhaust and supply ports that function as a four way valve. The through-cup is constructed of two spring loaded mating cups with a sealed exhaust port passing straight through the assembly.

In the preferred embodiment, a single through-cup has an exhaust port only. This configuration requires a cylinder A and B port, one exhaust port and a sealed valve housing which supplies pressurized air. With this embodiment, only one through-cup is required.

In one embodiment, there are dual through-cups with one supply and one exhaust port. This configuration requires a cylinder A and B port, two exhaust ports (one for each cup) and a sealed valve housing which supplies pressurized air. The advantage of this configuration is that the separate valve mechanisms can be located at the cylinder ends to minimize port length. In yet another embodiment, a single through-cup is provided with a central supply port and two exhaust ports. This allows a leaky logic pilot scheme without inverted pilot porting.

The motor valving includes two poppet assemblies 40 with one being located in the top cap and the other in the bottom cap. The poppet assembly 40 serves two functions. First it will supply air to valve pistons 47 and 48 and second, it will vent the air pressure in valve areas 47 and 48.

While in the normal or closed position, poppet assembly 40 allows pressurized supply air to pass through the top holes 41*a* in poppet housing 41, through the holes 43*a* in poppet 43, through the bottom holes 41*b* in the housing 41 to the valve piston area 47 or 48.

Air pressure plus spring 42 force holds the poppet 43 in the closed position sealed on seat 44. The motor piston 10 pushes on poppet actuator 45 compressing spring 46 until the spring 46 pressure exceeds the combined holding pressure of the supply air and spring 42 whereupon poppet 43 unseats from seat 44. The air pressure holding force quickly drops allowing the poppet 43 to snap open. When poppet 43 opens, it vents one of the valve piston areas (47, 48) through ports 41b, the flutes 45a in actuator 45 and out ports 44a to passage 50 and closes off supply air to that piston area allowing the valve 20 to shift. The vented air is routed to atmosphere independently through passage 50 from the valve exhaust thereby ensuring complete valve 20 shifts even if the valve exhaust is restricted. This is important in preventing the pump from hanging up.

Through most of the motor stroke, the A side of the poppet assembly is sealed preventing air leakage from the valve piston. As the motor reaches the end of its stroke, the motor piston opens the poppet's A side while sealing the B side. When the poppet opens, it vents one side of the piston valve, shifting the valve. Sealing the poppet on the B side ensures the depressurized side of the valve piston does not have a replenishing air supply thereby maximizing valve speed. After motor changeover, the poppet resets to its normal position. Fast changeover and valve speed translates to reduced output pressure pulsation from the pump and increased performance and efficiency.

Figure 6:
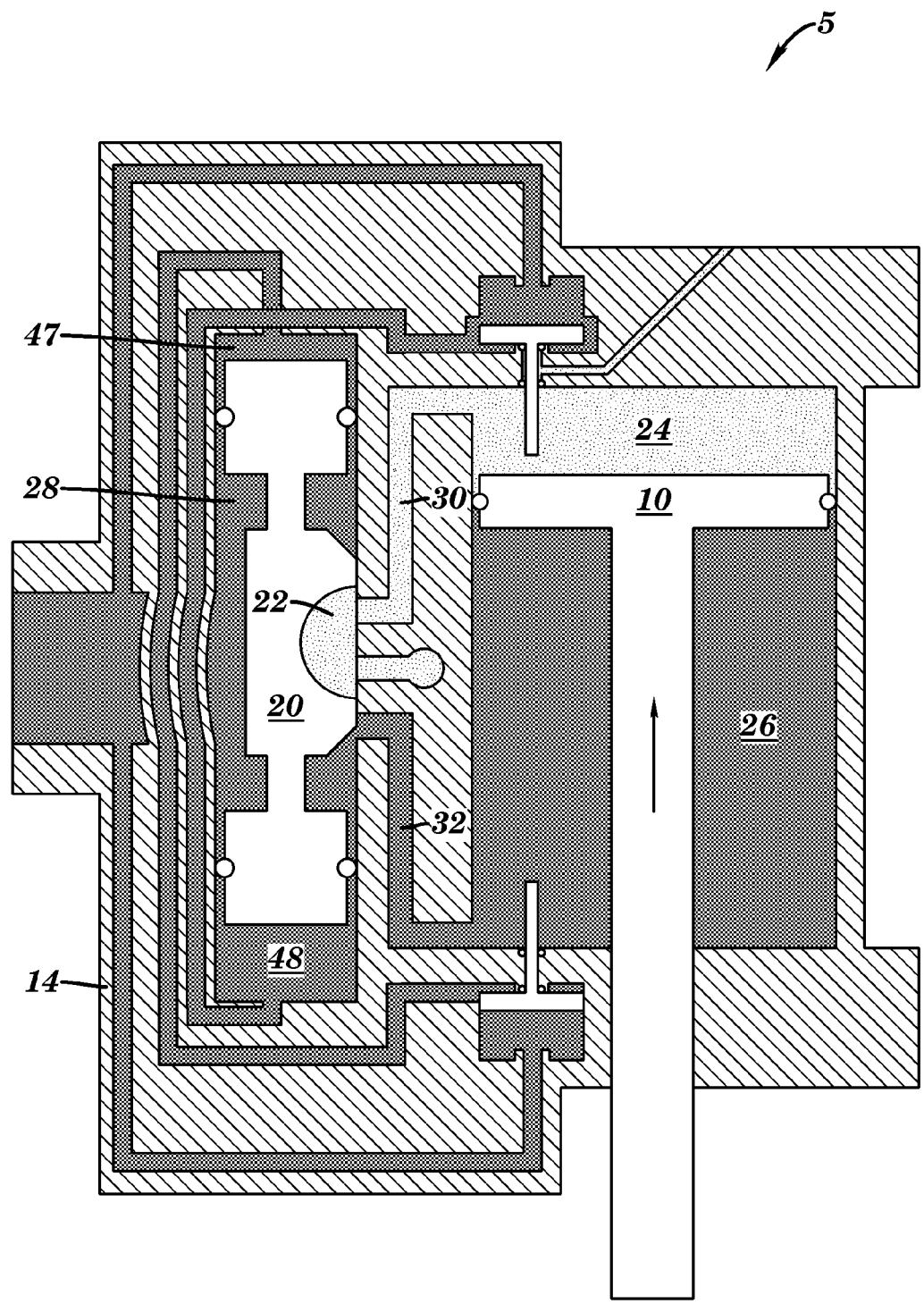
FIG. 6 shows a schematic of the air flow through the air valve and poppets while the piston travels upwardly.
Figure 7:
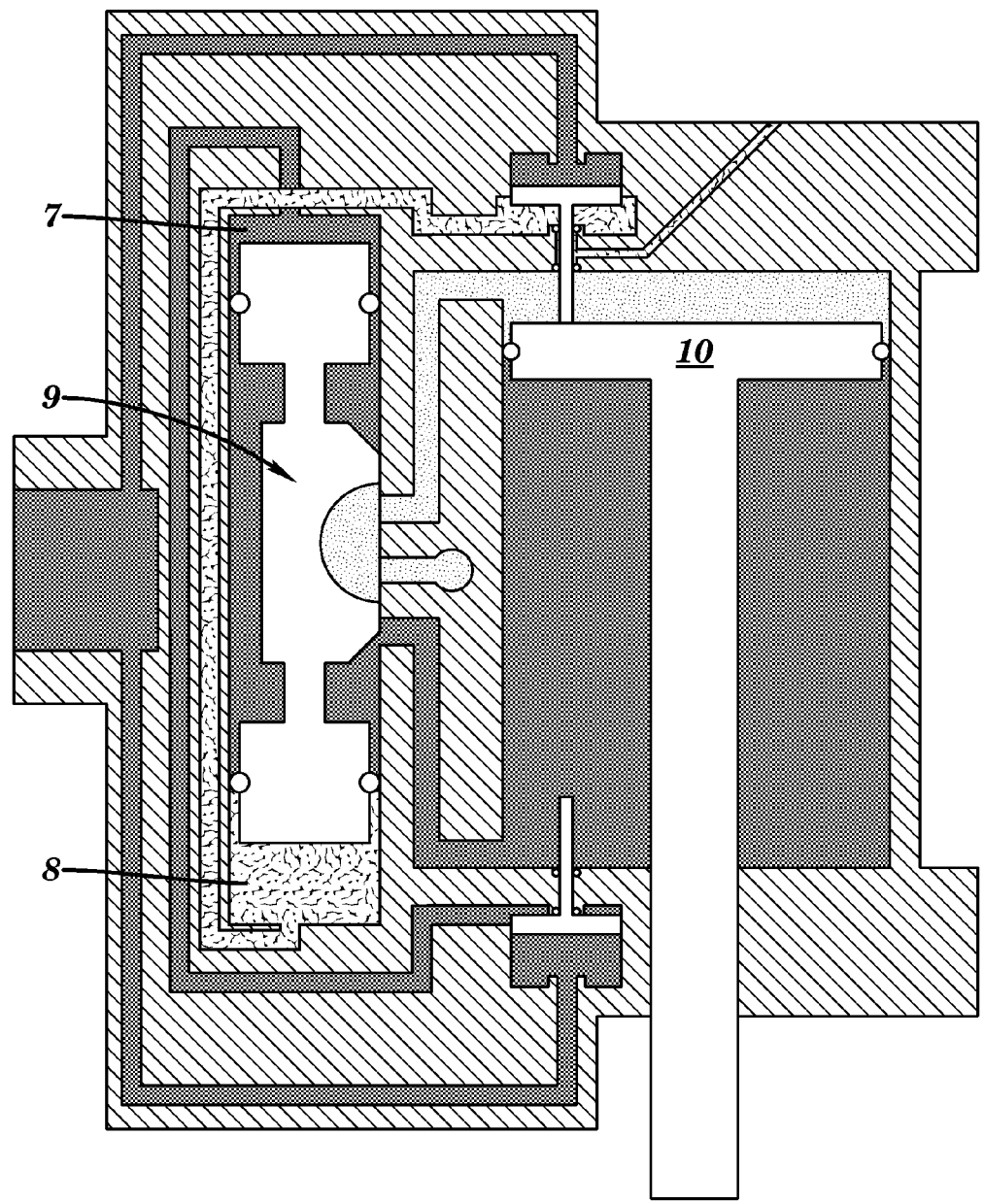
FIG. 7 shows a schematic of the air flow through the air valve and poppets while the piston is changing over at the upper limit of travel.
Figure 8:
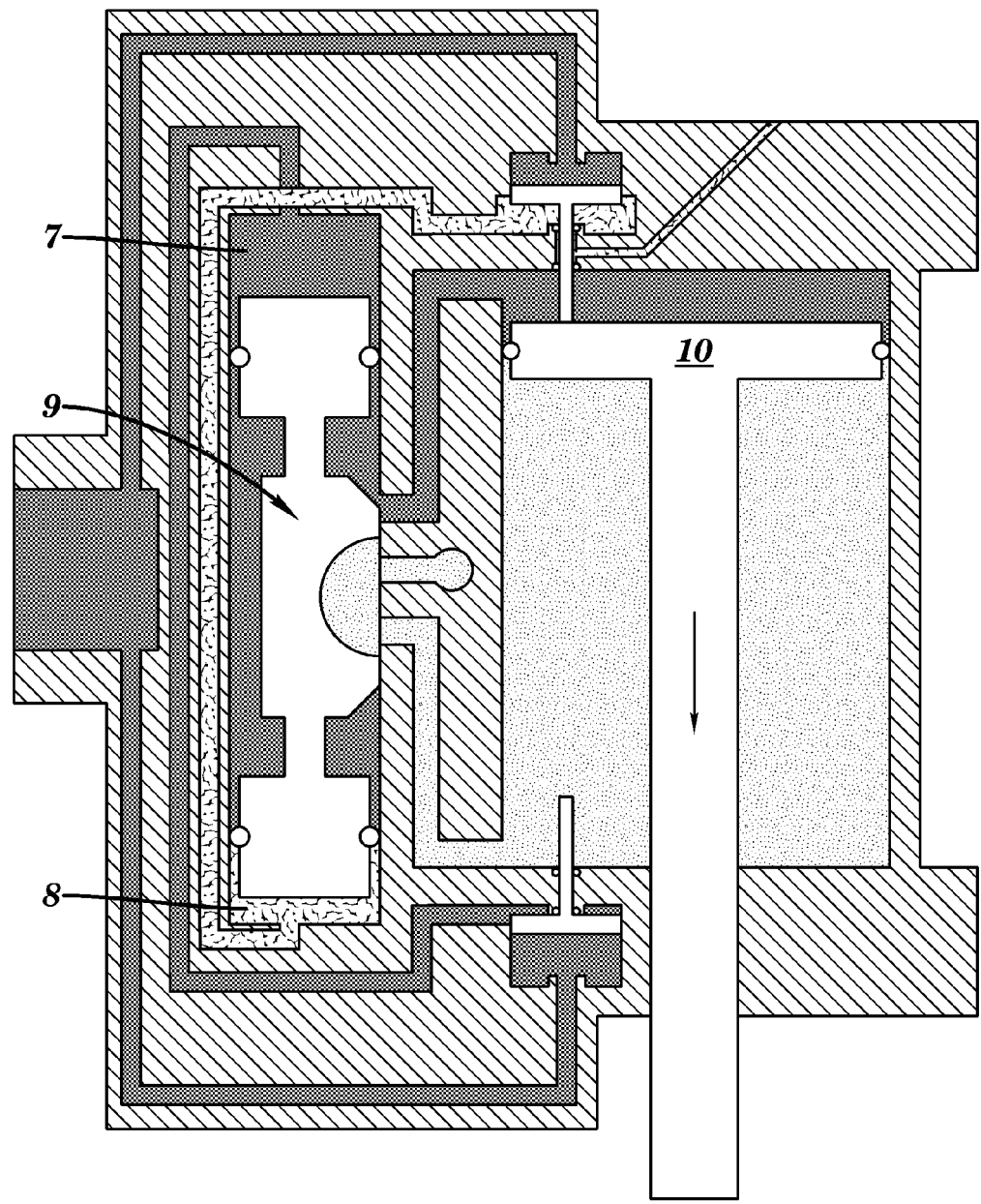
FIG. 8 shows a schematic of the air flow through the air valve and poppets after the valve has changed over.
Figure 9:
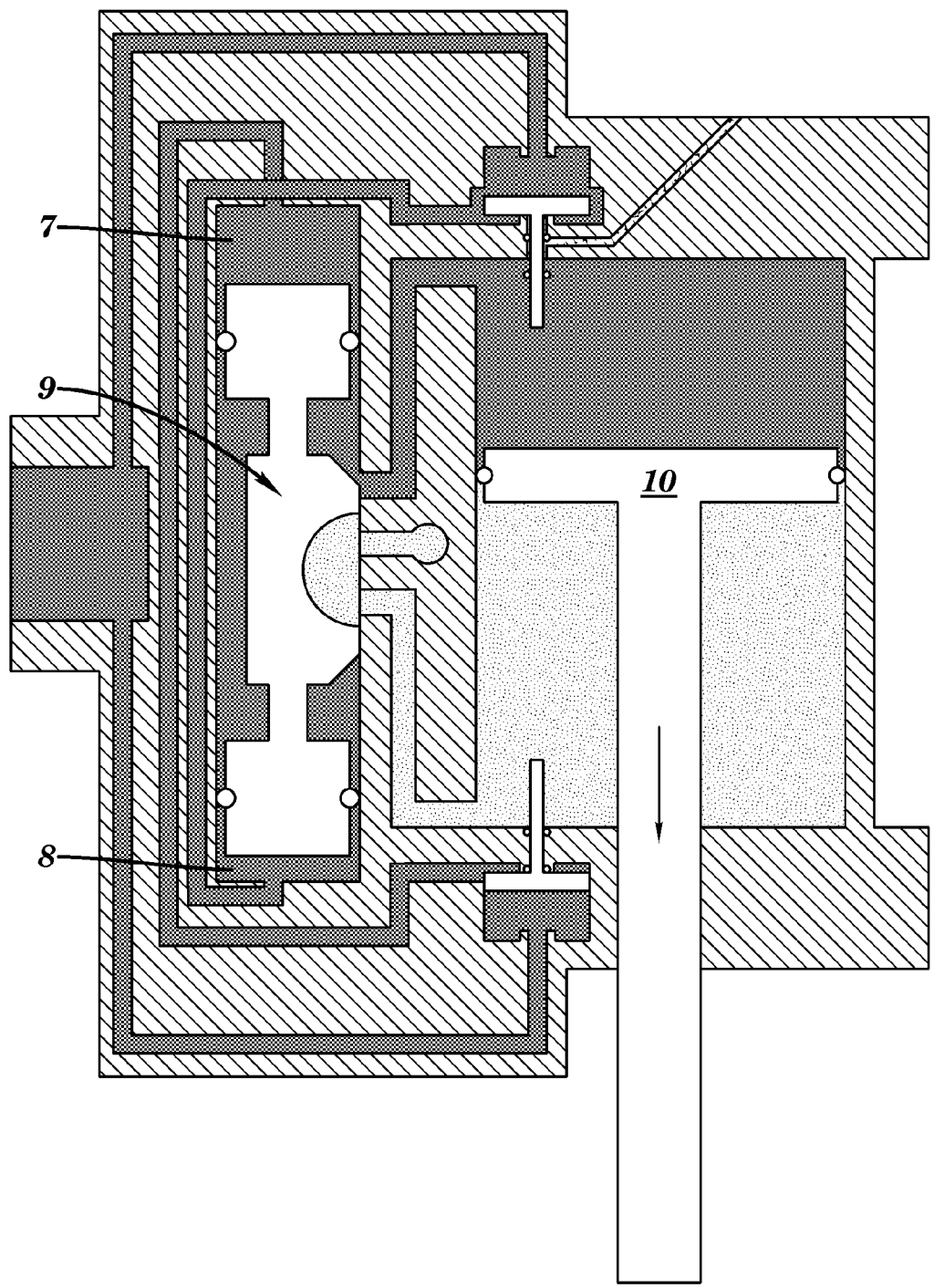
FIG. 9 shows a schematic of the air flow through the air valve and poppets while the piston travels downwardly.
Figure 10:
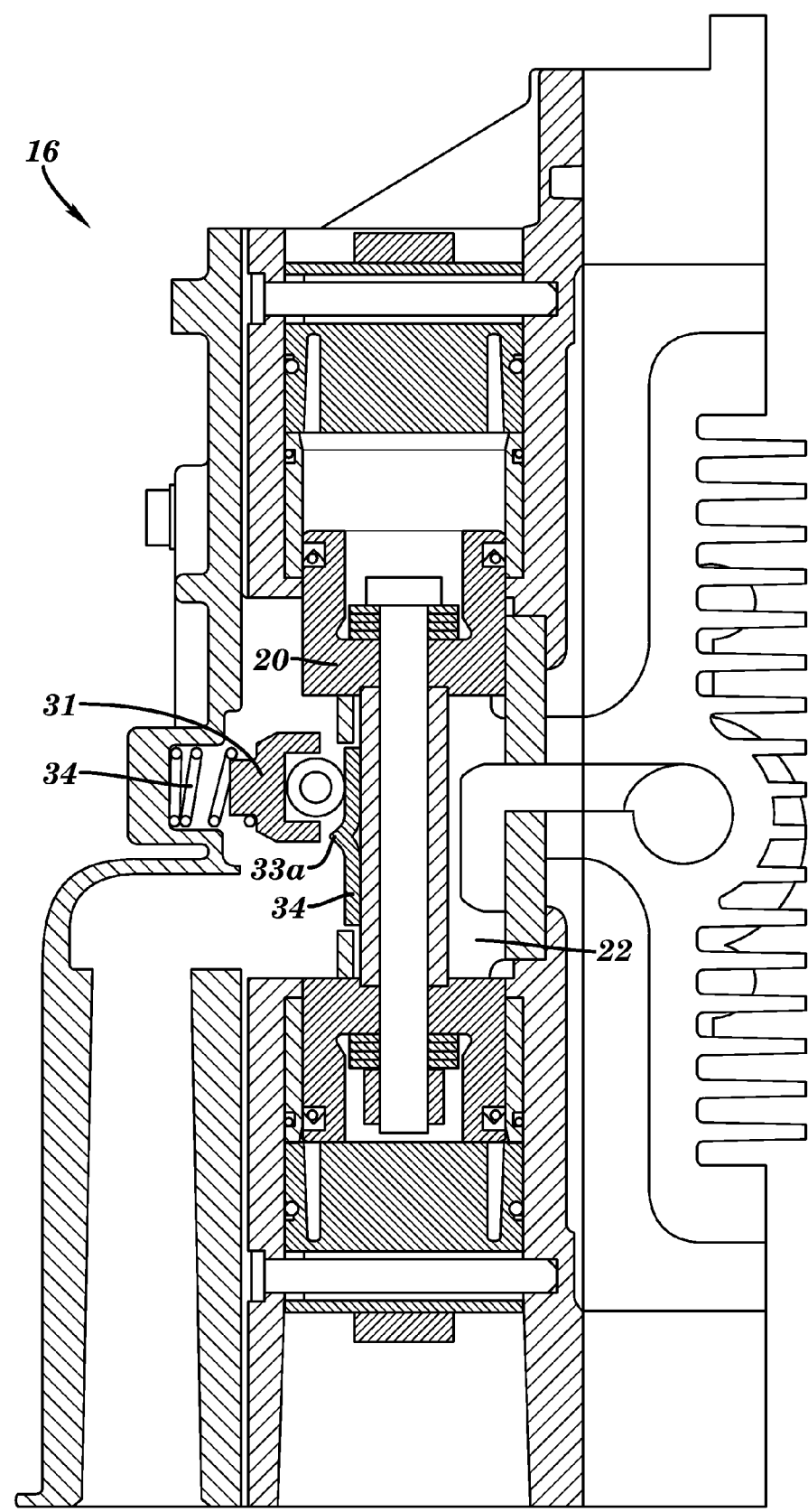
FIG. 10 shows a cross-section of the detented air valve of the instant invention.
Figure 11:
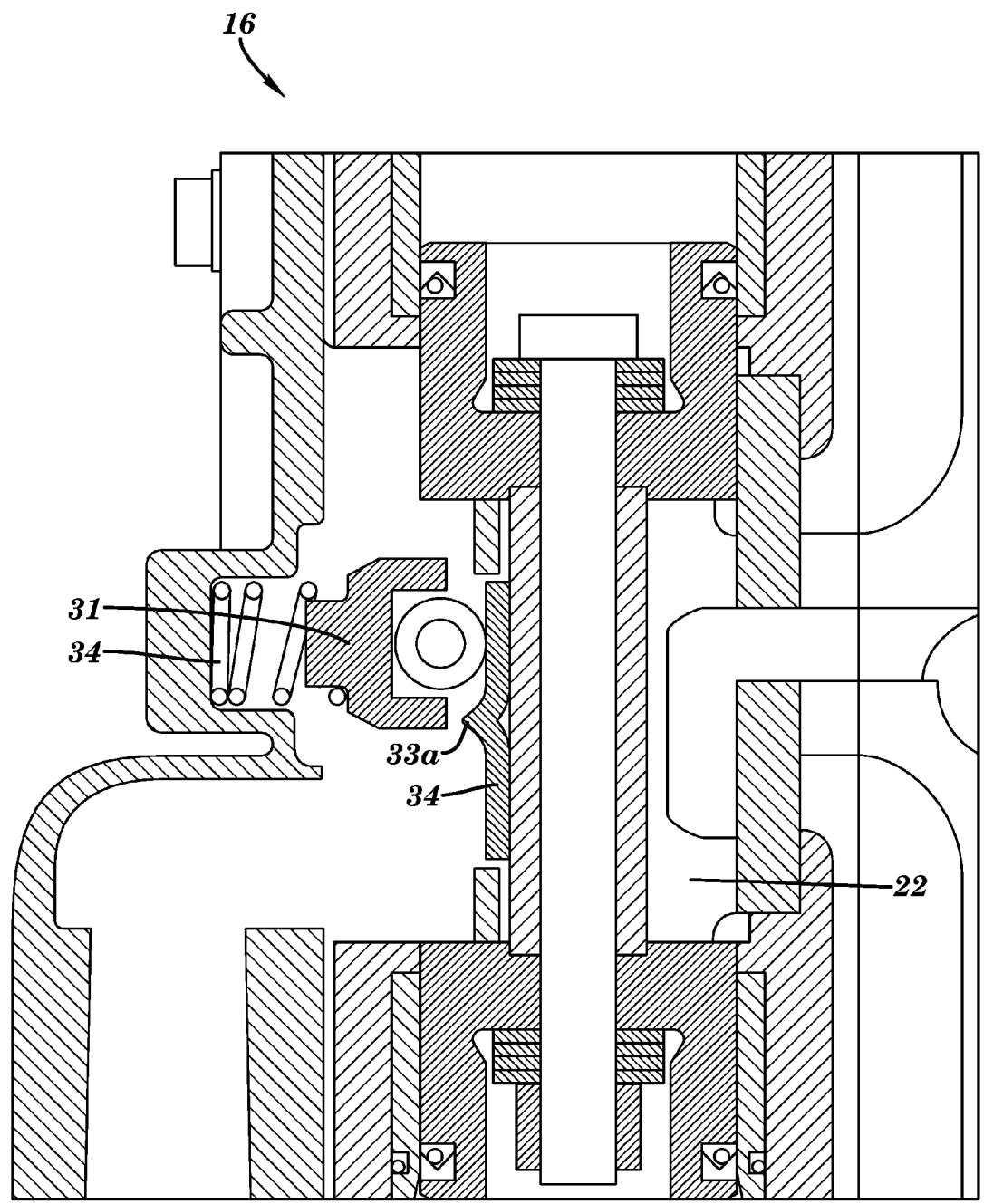
FIG. 11 shows a detailed cross-section of the detented air valve of the instant invention.
Figure 12:
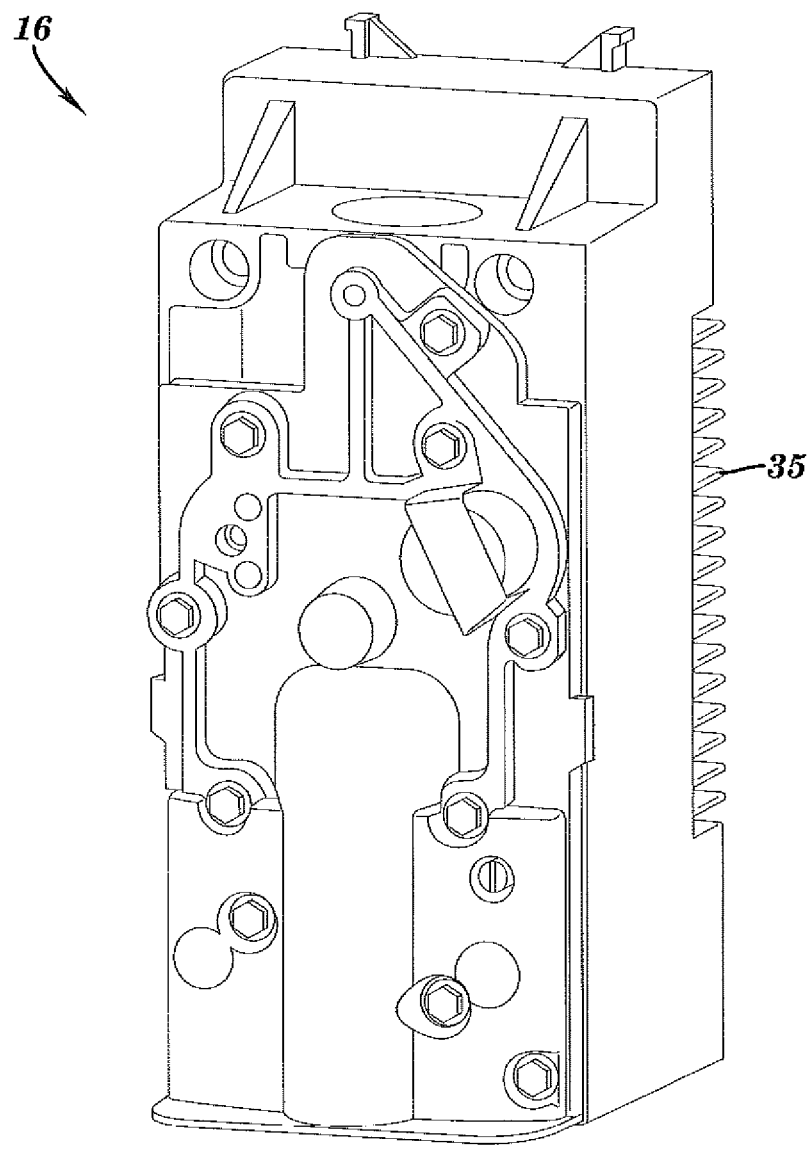
FIG. 12 shows the air valve assembly and solenoid of the instant invention.

Put simply as shown in FIGS. 6-9, the valve piston 19 is always located in the same end as the main piston 10 is traveling towards. Thus, in FIG. 6, main piston 10 is traveling upwardly and valve piston 20 is located in the upper end of the valve housing 14. Similarly, in FIG. 9, main piston 10 is traveling downwardly and valve piston 20 is located in the lower end of the valve housing 14. Also helpful in visualizing operation is that that top poppet assembly 40 communicates with the bottom valve piston area 48 while the bottom poppet assembly 40 talks to the top valve piston area 47.

The main air valve 16 has piston 20 which is provided with an exhaust cup 22 which alternatively communicates with the top 24 and bottom 26 of piston 10. The interior area 28 of the air valve housing 14 is provided with a source of pressurized air. Valve piston 16 moves and alternately uncovers ports 30 and 32 which lead to the top 24 and bottom 26 of piston 10 respectively.

A detent is provided on the main air valve 16 and is comprised of a roller assembly 31, a spring 34 and a ramp 33 mounted to the back of valve cup 22. Roller assembly 31 allows ramp 33 and valve cup assembly 22 to move approximately 0.150 inches before nesting against ramp ridge 33a. The geometry of the roller assembly 31 and ramp 33 then hold the valve 16 in position until the air signal from the poppet assemblies 40 is sufficient to fully move the valve cup 22. Because of the radii of the ramp and the pointed ridge 33a, the valve assembly 16 is unstable at ridge 33a. This prevents the valve assembly from stopping in a centered position which would stall the motor. It also prevents the valve assembly 16 from centering during transit which could cause startup problems.

Another function of the detent is to ensure that the valve cup assembly 22 moves off the solenoid 35 which extends to block valve assembly 16 after a runaway condition has occurred. The solenoid 35 is battery powered and has a low retraction force. When energized, the valve assembly 16 is allowed to move 0.220 inches before coming into contact with solenoid 35. The solenoid 35 then prevents valve assembly 16 from moving further thereby stopping the motor.

It is contemplated that various changes and modifications may be made to the valve and poppets without departing from the spirit and scope of the invention as defined by the following claims.

The invention claimed is:

1. An air operated reciprocating piston pump for use with a source of compressed air having a cylinder with first and second ends, a piston in said cylinder and a main air valve having first and second ends and further comprising: first and second poppets located in said first and second cylinder ends for contact by said piston at the ends of its stroke, said poppets being biased at all times into a closed position by a spring and being biased at all times into a closed position by air pressure and operable by said piston into a second position whereby in said closed position, said source of compressed air is connected to one of said main valve ends and in said second position vents said one valve end directly to atmosphere and further comprising a ramp detent forcing said main air valve to either of said ends.

2. A poppet assembly comprising:
   a poppet housing having an axis and first and second sets of housing ports, said first and second sets of housing ports being axially spaced;
   a poppet seat in said housing, said seat having a set of seat ports;
   a poppet located in said poppet housing and retained therein by said seat, said poppet having a spring and a set of poppet ports and being biased by said spring at all times and by air at all times against said seat in a first position and moveable to a second position away from said seat;
   a poppet actuator located in said seat and partially surrounding said poppet, said poppet actuator being biased away from said poppet, whereby when said poppet is in said first position, said first set of housing ports are in fluid communication with said second set of housing ports through said poppet ports and when in said second position, first set of housing ports are in fluid communication with said seat ports.

3. An air operated reciprocating piston pump for use with a source of compressed air having a cylinder with first and second ends, a piston in said cylinder and a main air valve having first and second ends and a ramp detent forcing said main air valve to either of said ends and further comprising: first and second poppet assemblies located in said first and second cylinder ends for contact by said piston at the ends of its stroke, said poppets being biased at all times into a closed position by a spring and at all times by air pressure and operable by said piston into a second position, said poppet assemblies comprising:
   a poppet housing having an axis and first and second sets of housing ports, said first and second sets of housing ports being axially spaced;
   a poppet seat in said housing, said seat having a set of seat ports;
   a poppet located in said poppet housing and retained therein by said seat, said poppet having a set of poppet ports and being biased against said seat in a first position and moveable to a second position away from said seat;
   a poppet actuator located in said seat and partially surrounding said poppet, said poppet actuator being biased away from said poppet, whereby when said poppet is in said first position, said first set of housing ports are in fluid communication with said second set of housing ports through said poppet ports and when in said second position, first set of housing ports are in fluid communication with said seat ports whereby in said closed position, said source of compressed air is connected to one of said main valve ends and in said second position vents said one valve end directly to atmosphere.

* * * * *